Patented May 30, 1939

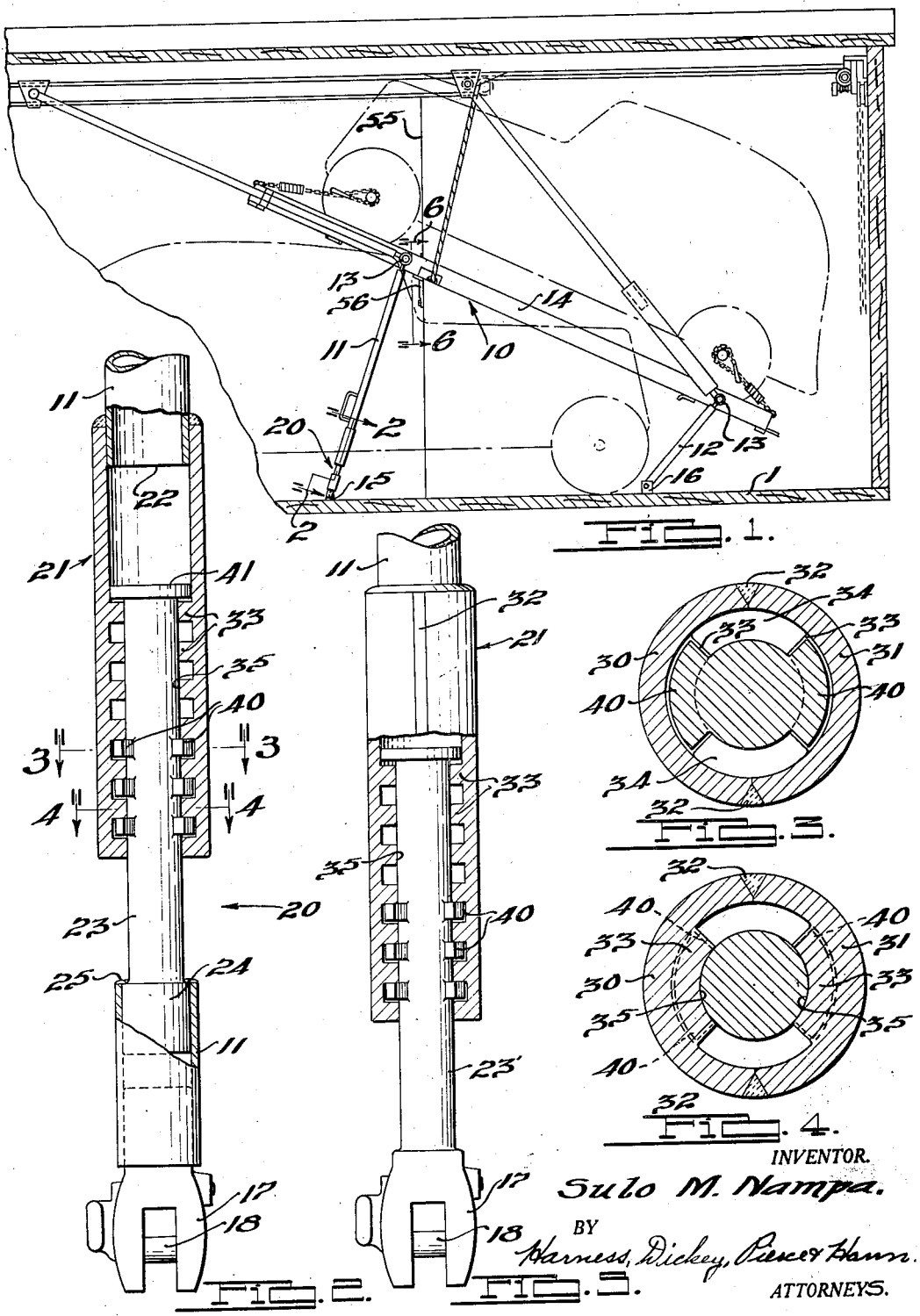

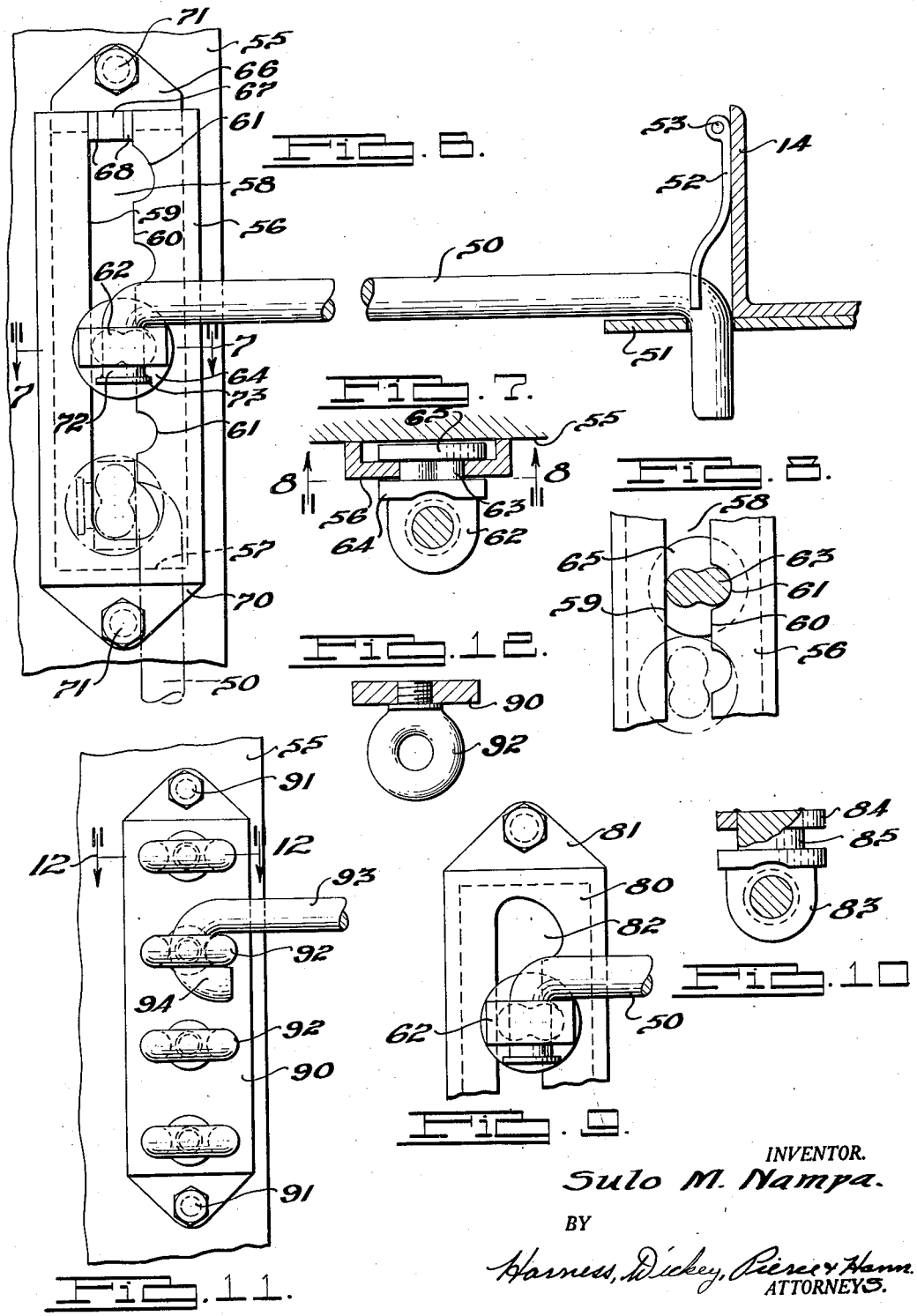

2,160,079

UNITED STATES PATENT OFFICE 2,160,079

CAR LOADING DEVICE

Sulo M. Nampa, Detroit, Mich., assignor to The Worth Company, a corporation of Michigan Application January 2, 1936, Serial No. 57,206

5 Claims. (Cl. 105—368)

The invention relates to car loading devices of the type disclosed in the patent to Samuel D. Butterworth, No. 2,079,930 of May 11, 1937. More specifically it relates to a means for adjusting the elevation of the loading frame disclosed in the aforementioned Butterworth application to adapt the frame for the accommodation of automobiles of varying sizes.

In the aforementioned copending application of Samuel D. Butterworth is disclosed an automobile loading frame mounted in a freight car by means of suitable linkages and hoisting mechanism adapted to elevate the frame and an automobile positioned thereon to an elevated inclined position in order that a second automobile can be positioned on the floor of the car beneath the frame. When the frame is elevated to its semi-decking position it is secured in place by means of strut members which are pivotally secured to the loading frame and adapted to be pivotally connected to the floor of the freight car.

It has been found desirable to provide means for adjusting the elevation of the loading frame to accommodate automobiles of varying sizes, and it is the object of the present invention to provide means inherent in the strut itself for adjusting its effective length and thereby controlling the elevation of the frame at the point to which the strut is connected.

Another object of the invention is to provide an extensible strut adapted to be readily adjusted to the desired length and which cannot be changed in length so long as it is mounted in operative position.

Another object of the invention is to provide an extensible unit adapted for ready attachment in the struts now in use for supporting loading frames in a freight car.

Another object of the invention is to provide an adjustable mounting for an anti-side sway hook in order that the hook may prevent side sway of the loading frame in any one of its vertically adjustable positions.

Other objects and advantages of the invention will become apparent from the following specification and claims and appended drawings.

Referring to the drawings wherein like numerals are applied to like parts in the several views:

Figure 1 is a fragmentary, longitudinal, vertical section of a freight car showing the loading frame in operative position;

Fig. 2 is an enlarged section of the extensible strut unit taken on the line 2—2 of Fig. 1;

Fig. 3 is a transverse section taken on the line 3—3 of Fig. 2;

Fig. 4 is a transverse section taken on the line 4—4 of Fig. 2;

Fig. 5 is a view similar to Fig. 2 showing a modified form of the extensible strut;

Fig. 6 is a transverse sectional view taken on the line 6—6 of Fig. 1 and showing the anti-side sway hook;

Fig. 7 is a fragmentary, sectional view taken on the line 7—7 of Fig. 6;

Fig. 8 is a vertical section taken on the line 8—8 of Fig. 7;

Figs. 9 and 10 correspond to Figs. 6 and 7 and show a modified form of the hook supporting structure;

Fig. 11 is a view corresponding to Fig. 6 and showing a further modification of the hook supporting structure;

Fig. 12 is a section taken on the line 12—12 of Fig. 11.

In Fig. 1 there is shown a freight car having a floor 1 and a loading frame 10 adapted to assume an elevated and inclined position in the freight car while supporting an automobile. The loading frame and the means for supporting and elevating it into the semi-decking position in the freight car forms no part of the present invention as it is fully set forth in the copending application of Samuel D. Butterworth, Serial No. 646,830, filed December 12, 1932. It is sufficient to state here that when the frame with an automobile thereon is elevated to the position shown in Fig. 1 strut members 11 and 12, which are permanently pivoted as at 13 to the longitudinal side frame members 14 of the loading frame, are pivotally connected to upstanding ears 15 and 16 connected to the floor 1 of the freight car. This connection is effected by means of a clevis 17 on the lower end of the strut and a removable pin 18 passing through the clevis arms and the ears 15 or 16. The clevis and floor mounted ear connection may be of the type disclosed in the copending application of Samuel D. Butterworth and Sulo M. Nampa, Serial No. 743,372, filed September 10, 1934, which discloses a socket member adapted to be imbedded in the floor of the car and to carry a pivotally mounted apertured ear adapted to cooperate with a clevis on the lower end of the strut. When the strut is removed the pivoted ear may be swung into the socket and below the level of the floor where it will not interfere with normal use of the freight car. It will be observed that when connected to the floor of the car the struts support the frame in its semi-decking position.

The present invention resides in the provision of an extensible portion in the strut of the type mentioned. In Fig. 1 this extensible unit 20 is shown in connection with the strut 11 which is pivoted to the upper end of the loading frame. It is apparent, however, that it may be used with advantage in connection with the strut 12 at the lower end of the loading frame.

In existing installations the strut members are tubular and are telescoped over a shank on the clevis 17. Accordingly, in Figs. 1, 2, 4 and 5 is shown an extensible unit comprising a relatively movable housing 21 and inner member 23 adapted to be inserted intermediate the ends of existing struts. Such installation is accomplished by cutting out an intermediate strut section, telescoping the housing 21 over and welding it to the upper free end 22 of the strut, and telescoping the enlarged end 24 of the inner member 23 within and welding it to the lower free end of the strut.

The housing 21 is formed of a pair of complementary semi-cylindrical sections 30 and 31 welded together along their free edges as shown at 32 in Figs. 3, 4 and 5. The interior of the cylindrical housing 21 is provided with opposed sets of axially spaced arcuate shelves 33 spaced circumferentially from each other by open spaces 34. The inner boundaries 35 of the shelves 33 lie on an arc at a radius from the center of the housing slightly greater than the radius of the shank of the inner member 23 of the extensible unit, as indicated in Fig. 4. The shank of the inner member 23 is provided with two opposed series of radial arcuate projections 40 having an axial dimension or thickness slightly less than the axial distance between the shelves 33 of housing 21, and having a circumferential extent slightly less than the circumferential extent of the space 34 between the ends of shelves 33.

As the result of this construction, when the inner member 23 is rotated with respect to the housing 21 into the position wherein the projections 40 on the shank of member 23 are aligned axially with the open spaces 34 between the ends of shelves 33, the two members 21 and 23 may be shifted axially with respect to each other until the strut 11 has the desired effective length. Thereupon the housing 21 and inner member 23 may be rotated relatively into the position shown in Figs. 2, 3 and 4 wherein the projections 40 are positioned between the adjacent shelf members 33 and no axial movement between the members 21 and 23 is possible. In the latter position the axes of the pivotal connection 13 between the upper end of the strut and the loading frame and the axis of the pin 18 in clevis 17 at the lower end of the strut are parallel and in the position which they assume when the strut is operatively connected to the loading frame and to the ear 15. Accordingly, after the strut is adjusted to the desired length and placed in operative position no axial movement between the elements of the extensible units can occur.

When the units 21 and 23 are initially assembled, the inner member 23 is pushed into the opening in the lower end of the housing 21 and clear through the same until it projects at the top. Thereupon the circular plate member 41 is welded to the top of the inner member 23. This provides a permanent connection between the two members of the extensible unit and positively prevents separation of one member from the other without interfering with the desired axial adjustability.

The modification shown in Fig. 5 is similar to that shown in Figs. 1 and 2 except that the inner member 23' forms an integral part of the clevis 17. This form is adapted for use in new installations, whereas in the form previously described is intended for insertion in existing installations.

In the normal use of the type of loading frame here involved, it is customary to provide an anti-side sway hook permanently pivoted to the freight car and engageable with the frame to prevent objectionable side sway of the frame during severe jolting movement of the freight car. Such an anti-side sway hook is disclosed in the co-pending application of Sulo M. Nampa, Serial No. 46,852, filed October 26, 1935. In the present case, however, it is necessary in view of the fact that the loading frame is adjustable vertically to provide a similar adjustment for the connection between the end of the anti-side sway hook and the freight car, and, accordingly, such means are provided in the present application.

Referring to Fig. 6, the side sway hook 50 is shown in operative engagement with an aperture in a plate 51 which is welded or otherwise permanently secured to the horizontal leg of the main side frame member 14 of the loading frame. A latch member 52, pivoted at 53 to the side frame member 14, is adapted to fall by gravity into a position wherein it blocks disengagement of the hook 50 from the aperture in plate 51, all as set forth in the last mentioned co-pending application. In the present application the opposite end of the hook 50 is pivotally secured to the laterally extending face of the upright member 55 which forms an integral part of the freight car, such as one of the upright members forming the door opening therein as shown in Fig. 1, by means which permit pivotal movement of the hook 50, and which may be adjusted vertically in accordance with the vertical adjustments of the loading frame.

The hook attaching means mentioned above comprises, in the preferred form, a channel shaped member 56 having an end wall 57 closing the lower end of the channel. The outer face of the channel is provided with a slot 58, having one straight side 59 and an opposing side 60 in which are provided a series of vertically spaced curved recesses 61. The slot 58 is open at its upper end for the reception of an eye member 62, shown best in Fig. 7. The eye member 62 is provided with a shank 63 having a cross-section of figure 8 form as shown in Fig. 8, and a pair of spaced circular discs 64 and 65 are integrally formed with the shank and eye and are spaced apart slightly more than the thickness of the channel member 56. The shank 63 is so formed that the eye member may be inserted into the open end of slot 58 when the shank thereof is turned sidewise, and discs 64 and 65 maintain the eye member in engagement with the slot.

After the eye member 62 is engaged in slot 58 of the channel member 56, the open end of the channel is closed by means of a lug member 66, which fits into the recess defined by the channel member and which is provided with an upstanding portion 67 adapted to fit into the open end of slot 58 and close the same. The outer surface of the upstanding portion 67 is provided with a pair of bevel portions adjacent the edges of slot 58, at which points the lugs 66 may be permanently secured to the channel member 56 by welding, as at 68. Lug 66, and a similar lug 70, which forms an integral part of the lower end of the channel member 56 are provided with apertures through which may be inserted bolts 71 for securing the channel member to the upright member 55. The hook 50 is provided at its outer end with a portion 72 bent at right angles to the shank and adapted to be inserted into the eye 62. A circular disc 73 is welded on to the butt of the hook portion 72 and operates to prevent removal of the hook from the eye member.

It will be apparent that the construction just described provides a permanent means for fastening the hooks to the side wall of the freight car for pivotal movement with respect to the car, which at the same time may be readily adjusted vertically to accommodate the possible adjusted positions of the loading frame. The vertical adjustment of the eye member 62 is accomplished by rotating the hook 50 and eye member 62 into the position indicated in dotted lines in the lower portion of Fig. 6, whereupon it may be moved upwardly or downwardly freely in slot 58. When the desired elevation is obtained the hook and eye members are returned to the position shown in solid lines in Fig. 6, wherein the shank of the eye member projects into one of the curved notches 61 in the side of slot 58. Since the hook 50 itself, when engaged with the loading frame 10, precludes rotational movement of the eye member 62, there is no possibility of the eye member moving vertically in slot 58 as long as the hook is engaged with the loading frame.

In Figs. 9 and 10 is shown a slightly modified form of the construction illustrated in Figs. 6, 7 and 8. In the modified form of Figs. 9 and 10, the channel member 80 is provided with integral lugs 81 at both ends, and both ends of the slot 82 are closed. In this form the eye member 83 is similar to the eye member 62 previously described, except that the disc member 84 is formed of a separate piece from the rest of the eye member and is welded in position on the shank 85 after the eye member is inserted in slot 82. In all other respects this form is identical to that previously described.

In Figs. 11 and 12 is shown a further modification of a simpler form than that previously described but which does not provide a permanent connection between the hook and the car. In the form shown in Figs. 11 and 12, a plate member 90 is bolted to the upright member 55 by means of bolts 91 and is provided with a plurality of vertically spaced eye members 92, the shanks of which are threaded into suitable openings in the plate member 90, and preferably permanently secured therein by welding or otherwise. The hook 93 is provided with a U-bend 94, adapted to engage in any one of the eyes 92. It will be apparent that when the hook 93 is in operative engagement with the loading frame it cannot become disconnected from the eye member 92 with which it is associated. To disconnect the hook, it is necessary to swing it downwardly into a vertical position, whereupon the hook may be disengaged from the eye by an upward rectilinear movement.

From the foregoing, it is apparent that there is provided, in accordance with the present invention, a very simple means for adjusting the elevation of the loading frame and positively fixing it at the desired elevation by means of the adjustable strut members and the adjustable anti-side sway hook described above. In the preferred form shown, all of the parts are permanently secured together and hence cannot become displaced from one another and yet they are readily adjustable to the desired position with a minimum of effort and delay.

What is claimed is:
1. An adjustable eye mounting for an anti-side sway hook comprising a slotted plate, an eye having a shank engaged in said slot and having shoulders on opposite sides of said plate for retaining the eye member in engagement therewith, said shank having one diameter slightly less than the width of said slot and another diameter at right angles to the first mentioned diameter substantially greater than the width of said slot, and said slot having notches in one side for the reception of said shank when its greatest diameter is perpendicular to said slot.

2. An adjustable eye mounting for an anti-side sway hook comprising a slotted plate, an eye having a shank engaged in said slot, means for preventing movement of said shank axially thereof with respect to said plate, said shank having one diameter slightly less than the width of said slot and another diameter at right angles to the first-mentioned diameter substantially greater than the width of said slot, and said slot having notches in one side for the reception of said shank when its greatest diameter is perpendicular to the slot.

3. An adjustable mounting for an anti-side sway hook comprising a slotted plate, a hook support having a shank extending into said slot, a hook connected to said support and cooperating means on said hook support and plate operable upon rotation of said support with respect to said plate for fixing the support in any one of a plurality of positions in said slot, said cooperating means being releasable only upon rotation of said hook and hook support with respect to the plate.

4. In combination, a slotted supporting plate, an anti-side sway hook, means on said hook extending into said slot, said hook and means being pivoted together about an axis perpendicular to the plane of said slot and through said means, and cooperating means on said first-named means and said plate for fixing said first-named means at any one of a plurality of points along said slot, said cooperating means being operative when the hook is in one angular position with respect to said plate and being rendered inoperative when the hook is rotated about said axis.

5. In combination, a freight vehicle, an automobile loading frame, means for adjustably supporting said frame in elevated position in said vehicle, an antiside sway hook engageable with the frame, means adjustably connecting the hook to the vehicle for pivotal movement from a horizontal frame-engaging position to a substantially vertical inoperative position about any one of a plurality of horizontal axes extending longitudinally of the vehicle, said last-named means comprising a pair of elements connected for relative pivotal movement and for relative rectilinear adjustment, one of said elements being connected to the vehicle and the other being connected to the hook, and means movable upon pivotal movement of said hook for preventing adjustable rectilinear movements of said elements relative to each other when said hook is in its horizontal frame engaging position.

SULO M. NAMPA.